US006431454B1

(12) United States Patent
Hjelmvik

(10) Patent No.: US 6,431,454 B1
(45) Date of Patent: Aug. 13, 2002

(54) METHOD OF EFFECTING PAYMENT WITH A CASH CARD THAT INCLUDES AN ELECTRONIC PURSE

(75) Inventor: Torbernt Hjelmvik, Järfälla (SE)

(73) Assignee: Modul-System Sweden AB, Järfälla (SE)

( * ) Notice: Subject to any disclaimer, the term of this patent is extended or adjusted under 35 U.S.C. 154(b) by 0 days.

(21) Appl. No.: 09/646,850

(22) PCT Filed: Mar. 30, 1999

(86) PCT No.: PCT/SE99/00526

§ 371 (c)(1),
(2), (4) Date: Sep. 23, 2000

(87) PCT Pub. No.: WO99/50803

PCT Pub. Date: Oct. 7, 1999

(30) Foreign Application Priority Data

Mar. 31, 1998 (SE) .............................................. 9801135

(51) Int. Cl.7 ................................................ G06K 19/06
(52) U.S. Cl. ........................................ 235/492; 235/384
(58) Field of Search .................................. 235/492, 384

(56) References Cited

U.S. PATENT DOCUMENTS

| | | | | |
|---|---|---|---|---|
| 5,521,362 A | | 5/1996 | Powers | |
| 6,047,888 A | * | 4/2000 | Dethloff | 235/492 |

FOREIGN PATENT DOCUMENTS

| | | |
|---|---|---|
| EP | 0 775 990 | 5/1997 |
| EP | 0 806 747 | 11/1997 |
| WO | WO 95/21427 | 8/1995 |

* cited by examiner

*Primary Examiner*—Harold I. Pitts
(74) *Attorney, Agent, or Firm*—Alfred J. Mangels

(57) ABSTRACT

A method of effecting payment with a cash card that includes an electronic purse, such as a smart card that includes a chip and with which money can be deposited in said chip. When used for payment the card is read in a pay terminal, such as a cashpoint teller or automatic teller, and the payment sum is subtracted from the amount stored in the chip. The card includes data relating to a cash card number to which the card is tied. When the card is read in the cash card reader of a pay terminal the cash card number is read and is registered to enable a cash card transaction to be carried out, and the amount available on the chip is also read and registered. The pay terminal subtracts the amount concerned from the chip only when the chip contains an amount sufficient to cover the whole of the sum concerned and remains in the cash card reader for a period of time sufficient for the transaction to be carried out. The pay terminal then erases cash card number that was registered. The pay terminal is caused to carry out a conventional cash card transaction when the chip does not contain sufficient funds to cover the whole of the amount concerned, or if it is not left in the cash card reader for a sufficient length of time.

6 Claims, 1 Drawing Sheet

METHOD OF EFFECTING PAYMENT WITH A CASH CARD THAT INCLUDES AN ELECTRONIC PURSE

BACKGROUND OF THE INVENTION

1. Field of the Invention

The present invention relates to a method of effecting payment by means of a cash card equipped with an electronic purse.

2. Description of the Related Art

A novel type of cash card is at present being introduced in different parts of the world. This cash card is a so-called smart card that includes a chip, into which money can be loaded. When the card is used for payment, the card is inserted into a pay terminal, such as a pay till, and the amount concerned is withdrawn from the sum stored in the chip. The sum of money stored in the chip is thus counted down by the amount paid. Money can be transferred to the chip in the cash card from, e.g., a bank account or the like, at a bank or at a special terminal intended for this purpose.

An EMV card is an example of this type of card at present being introduced, where EMV stands for Eurocard, American Express and Visa. Such cards are tied to a credit card account with respective cash card companies. Data relating, inter alia, to the account number is stored in the chip and/or on a traditional magnetic tape on the rear side of the card.

One problem with the use of such cards is that the card owner is not always aware of the extent of the funds available in the card chip. This is particularly the case when the card owner purchases a service that is debited at a later date, i.e. when the card owner is not aware of the final charge. Vehicle parking fees, the use of card-operated telephone boxes, etc., are examples of such services. Conventional credit card transactions are also relatively expensive, and it is therefore desirable to avoid such transactions.

Another problem resides in the use of motorized cash card readers, because they require the availability of personnel to open the machine when it fails to feed-out a card that has been "swallowed" by the motorized card reader. Consequently, a manual card reader is preferred with which the user pushes in his/her card and manually withdraws the card. One problem with so-called smart cards in this respect is that the card must be inserted into the card reader as the transaction is carried out. Thus, a transaction cannot be carried out through the medium of the chip if the user withdraws the card prematurely.

The present invention solves these problems.

SUMMARY OF THE INVENTION

The present invention thus relates to a method of effecting payment with a cash card that includes an electronic purse, such as a so-called smart card which includes a so-called chip, into which a sum of money can be entered. The card is read in a pay terminal, such as a pay till when the card is used for payment, wherein an amount concerned is subtracted from the sum stored in the chip. The card includes data relating to a cash card number to which the card is tied. When the card is read in the cash card reader of a pay terminal, the cash card number is read and registered so as to enable a transaction to be performed, and the amount of money available on the chip is also read and registered. The pay terminal is caused to withdraw the amount concerned from the chip only when the chip contains sufficient funds to meet the full charge and the chip remains in the cash card reader for the duration of such a transaction, in which case the terminal is caused to erase the cash card number that had been registered, When the chip does not contain sufficient funds to effect a full payment or does not remain seated in the cash card reader, the pay terminal is caused to carry out a conventional cash card transaction.

BRIEF DESCRIPTION OF THE DRAWINGS

The invention will now be described in more detail with reference to an exemplifying embodiment thereof and also with reference to the accompanying drawing, in which.

DESCRIPTION OF THE PREFERRED EMBODIMENTS

Figure 2:
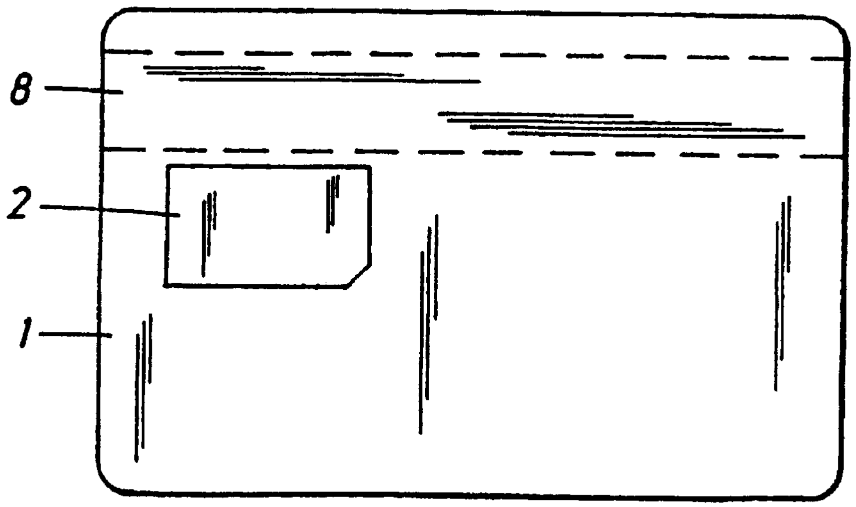
FIG. 2 illustrates a cash card according to one embodiment of the invention.

FIG. 2 illustrates an embodiment of a cash card 1 that includes an electronic purse. The card may be a smart card that includes a chip 2 into which a sum of money can be entered. When the card is used for payment, it is read in a pay terminal, such as a cash point teller, automatic teller or the like.

Figure 1:
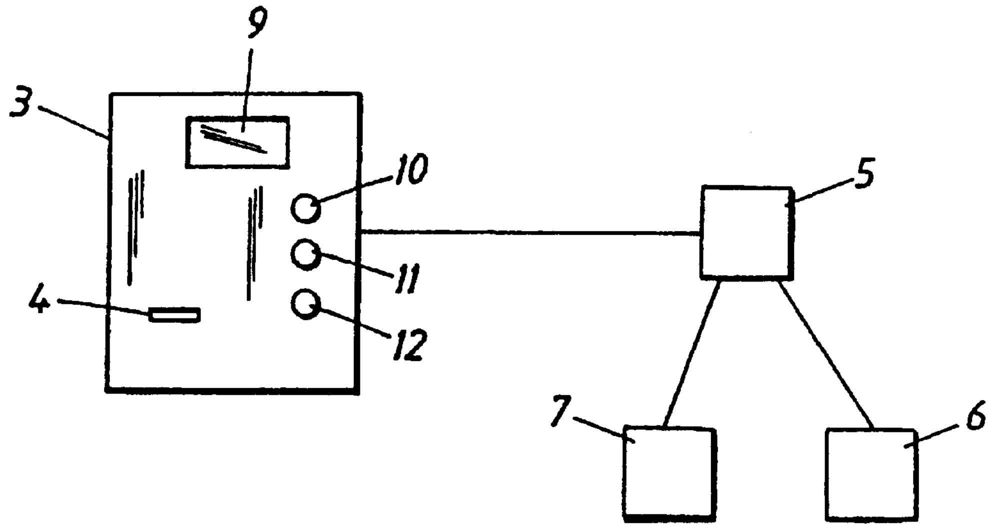
FIG. 1 illustrates a pay terminal and a block schematic.

The pay terminal may be any suitable type of terminal, depending on the nature of the payment to be made and on the intended purpose of the pay terminal. The pay terminal exemplified in FIG. 1 is a pay meter 3 with which parking fees are paid. The pay meter is provided with a card reader 4. The pay meter also includes a display 9 and possibly also buttons 10, 11, 12 with which the user can select a parking period, obtain a parking receipt, cancel the transaction, etc.

Subsequent to reading the card and establishing its validity, there is carried out a transaction in which the pay terminal co-acts with the card in communicative connection with the pay meter, and as a result the amount concerned, corresponding with the payment to be made, is subtracted from the sum stored in the chip. There will thus be less funds available in the chip after payment has been made.

The card 1 also includes data relating to the cash card number to which the card is tied.

In accordance with the invention, when the card 1 is inserted into the card reader 4 of a pay terminal 3, the card number is read and registered so as to enable a transaction to be carried out, and the amount available on the chip is also read and registered. These data are stored in the memory of a computer 5 in the pay terminal.

The pay terminal 3, 5 is caused to subtract the amount concerned by the payment from the chip, only when the chip 2 contains sufficient funds to cover a full payment, the card and remains seated in the cash card reader 4 while such a transaction is being carried out.

Data relating to the payment transaction is sent from the computer 5 of the pay terminal to, e.g., a bank computer 6, via one or more central computers, and the bank transfers money to the proprietor of the goods or service for which the card user made payment through the medium of said chip.

It is necessary for the card to remain in the pay terminal, in order for the computer 5 of said terminal to communicate with the chip 2. This does not present a problem in pay terminals that are equipped with motorized card readers and with which the card is not returned until the transaction has been completed. However, it is desirable to use a cash card reader that is manual, in which the user himself/herself inserts and withdraws the card. There is no danger of a manual card reader "swallowing" the card, i.e. failing to return a card that has been fed into the reader. Consequently, the attendance of service personnel is not as necessary as in other cases.

When the funds available on the chip carried by card are sufficient to cover the payment and the transaction is completed, the pay terminal erases the cash card number that had been read from the card and registered, so that no conventional cash card transaction can be carried out.

When the chip 4 does not contain sufficient funds to fully cover a payment, or does not remain in the cash card reader 4 while a chip based transaction is to be carried out, the pay terminal is caused to perform a conventional cash card transaction. This transaction is performed on the basis of the registered cash card number stored in the computer 5 of the pay terminal. The transaction is transferred from the computer 5 of said pay terminal, via one or more central computers, to a computer 7 belonging, e.g., to a cash card company for the amount of the card user and transferring money to the proprietor of the goods or service purchased by the user and paid for by means of the cash card transaction.

In one embodiment of the invention, the pay terminal is caused to read the card number from a machine readable code applied on said card 1. Such a code may be placed in a magnetic strip 8 on the card. Other codes, such as bar codes, may also be used.

In an alternative embodiment of the invention, the pay terminal is caused to read the card number from the card-carried chip.

One advantage of reading the cash card number from a magnetic strip is that if the user removes his/her card prematurely from the card reader before sufficient time has passed for a transaction with the chip to be effected, billing can nevertheless be carried out through a conventional cash card transaction, since the card number can be read as the card is pushed into or withdrawn from the card reader.

One example of a situation such as this is found in the parking of vehicles in a vehicle parking system in which a card is read by a pay meter at the beginning of a parking period and read again at the end of the parking period. For instance, the number of the cash card is stored at the commencement of a parking period and is again read and stored at the end of said parking period. If the user allows the card to remain in the card reader for a sufficient length of time, the parking fee can be paid by taking payment from the chip 2, which is the preferred method of payment. However, if the user withdraws the card prematurely, a cash card transaction takes place.

It will be evident from the aforegoing that the present invention solves the problems mentioned in the introduction and enables payment to be made primarily by means of the chip, while enabling a manual card reader to be used for cash cards that include an electronic purse in the form of said chip.

As will be understood, the invention is not restricted to the aforedescribed and illustrated embodiments thereof, since variations and modifications can be made within the scope of the accompanying Claims.

I claim:

1. A method of effecting payment with a cash card that includes an electronic purse, such as a smart card that includes a chip and with which money can be deposited in said chip, wherein when used for payment the card is read in a pay terminal, such as a cashpoint teller or automatic teller, that includes a cash card reader, wherein a payment sum is subtracted from the amount stored in the chip, and wherein the card includes data relating to a cash card number, said method comprising the steps of: reading the card in the cash card reader of the pay terminal to detect and to register the cash card number to enable a cash card transaction to be carried out; reading and registering a monetary amount available on the chip; subtracting within the pay terminal the payment sum from the chip only when the chip contains an amount sufficient to cover the whole of the payment sum concerned and the chip remains in the cash card reader for a period of time sufficient for a chip-based payment transaction to be carried out and for erasing the read and registered cash card number; and carrying out a conventional cash card transaction when the chip does not contain sufficient funds to cover the whole of the payment sum and when the chip is not left in the cash card reader for a sufficient length of time to carry out a chip-based transaction.

2. A method according to claim 1, including the step of reading the cash card number in a manual cash card reader from a machine readable code on said card.

3. A method according to claim 2, wherein the machine-readable code is a magnetic strip.

4. A method according to claim 2, wherein the machine-readable code is a bar code.

5. A method according to claim 2, wherein the machine-readable code is included in information carried in the chip.

6. A method according to claim 1, wherein the payment to be made is the cost for parking a vehicle within a vehicle parking system and the pay terminal is a pay meter, said method including the additional steps of: inserting the cash card into a pay meter at the beginning of a parking period; storing the cash card number in a computer associated with the vehicle parking system; and inserting the cash card into a pay meter at the end of the parking period.

* * * * *